US010225401B2

(12) United States Patent
Chatterjee et al.

(10) Patent No.: US 10,225,401 B2
(45) Date of Patent: Mar. 5, 2019

(54) EMERGENCY CALL BACK FOR REMOTE WORKERS

(71) Applicant: Avaya Inc., Santa Clara, CA (US)

(72) Inventors: Manish Chatterjee, Calcutta (IN); Purnendu Dhal, Rourkela (IN); Harsh V. Mendiratta, East Brunswick, NJ (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/053,087

(22) Filed: Feb. 25, 2016

(65) Prior Publication Data
US 2017/0251105 A1 Aug. 31, 2017

(51) Int. Cl.
| | | |
|---|---|---|
| H04M 3/51 | (2006.01) | |
| H04L 29/06 | (2006.01) | |
| H04M 3/523 | (2006.01) | |
| H04L 29/08 | (2006.01) | |
| H04L 12/46 | (2006.01) | |

(52) U.S. Cl.
CPC ....... *H04M 3/5116* (2013.01); *H04L 12/4679* (2013.01); *H04L 65/1006* (2013.01); *H04L 69/326* (2013.01); *H04M 3/5231* (2013.01); *H04L 12/4641* (2013.01)

(58) Field of Classification Search
CPC .................................................. H04M 3/42195
USPC ...................................................... 379/37–52
See application file for complete search history.

(56) References Cited

U.S. PATENT DOCUMENTS

| | | |
|---|---|---|
| 8,289,958 B1 | 10/2012 | Narayanan |
| 8,401,003 B1 | 3/2013 | Petit-Huguenin et al. |
| 2005/0083911 A1 | 4/2005 | Grabelsky et al. |
| 2007/0270164 A1 | 11/2007 | Maier et al. |
| 2008/0298799 A1 | 12/2008 | Takihiro et al. |
| 2009/0003312 A1 | 1/2009 | Velazquez et al. |
| 2009/0186595 A1* | 7/2009 | Son .................. H04W 4/22 455/404.1 |
| 2010/0172345 A1* | 7/2010 | Bjorsell ............ H04M 7/006 370/352 |

(Continued)

OTHER PUBLICATIONS

Plummer, "An Ethernet Address Resolution Protocol or Converting Network Protocol Addresses to 48.bit Ethernet Addresses for Transmission on Ethernet Hardware," Network Working Group RFC826, 1982, 10 pages.

(Continued)

*Primary Examiner* — Maria El-Zoobi
(74) *Attorney, Agent, or Firm* — Sheridan Ross P.C.

(57) ABSTRACT

A fingerprint is received from a communication endpoint. The fingerprint is based on a hardware identifier of the communication endpoint. For example the fingerprint may be based on a Media Access Control (MAC) address of the communication endpoint. A request for an emergency call from the communication endpoint is received that also includes the fingerprint. For instance, a user may initiate a 911 call from the communication endpoint. The emergency call is established. After the emergency call is disconnected, a request for an emergency call back is received. For example, if the emergency call prematurely disconnected, the emergency call back is initiated. The request for the emergency call back is routed to the communication endpoint based on the fingerprint to ensure that the emergency call is properly completed.

20 Claims, 4 Drawing Sheets

(56) References Cited

U.S. PATENT DOCUMENTS

| | | |
|---|---|---|
| 2012/0129482 A1* | 5/2012 | Li .................... H04M 3/42195 |
| | | 455/404.1 |
| 2013/0003698 A1 | 1/2013 | Olvera-Hernandez et al. |
| 2013/0203376 A1* | 8/2013 | Maier .................... H04W 4/70 |
| | | 455/404.2 |
| 2016/0065748 A1 | 3/2016 | Li et al. |
| 2016/0366574 A1 | 12/2016 | Dahan |
| 2017/0164204 A1* | 6/2017 | Fitzgerald ............... G06F 21/88 |

OTHER PUBLICATIONS

Bradley et al., "Inverse Address Resolution Protocol," Network Working Group RFC 2390, 1998, 10 pages.
U.S. Appl. No. 15/053,160, filed Feb. 25, 2016, Mendiratta.

\* cited by examiner

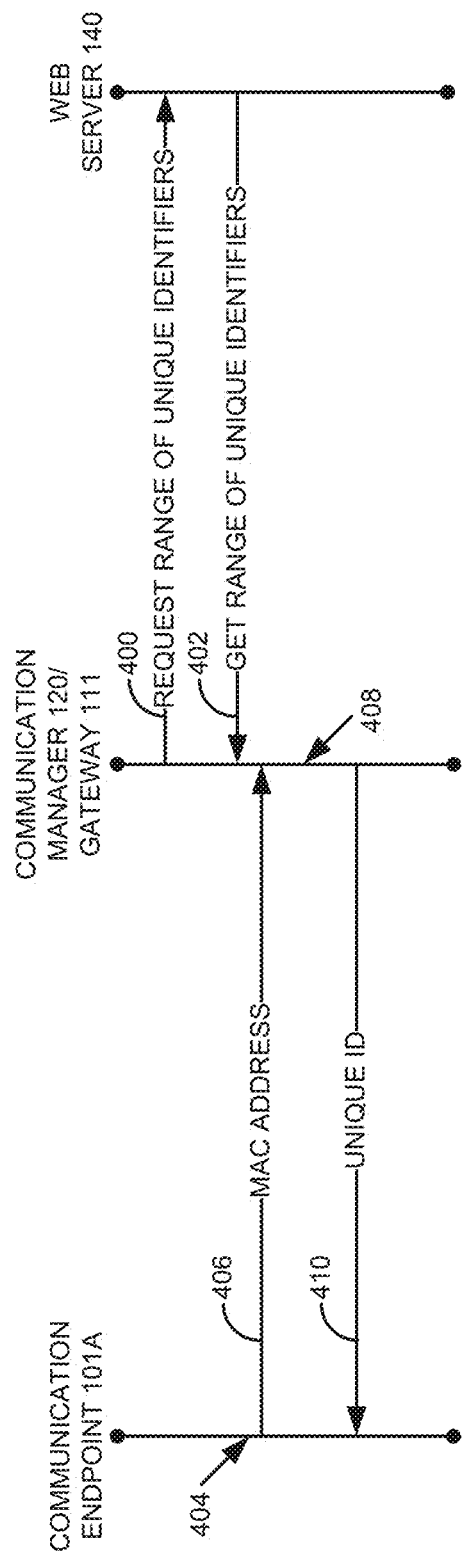

EMERGENCY CALL BACK FOR REMOTE WORKERS

TECHNICAL FIELD

The disclosure relates generally to communication systems and particularly to emergency communication systems.

BACKGROUND

Emergency Call Back is a feature associated with the Public Switched Telephone Network (PSTN). In the case where a caller prematurely disconnects after calling an emergency number (e.g., 911) the PSTN will attempt to reconnect the emergency call. In the case of unregistered Session Initiation Protocol (SIP) users prematurely disconnecting, the Emergency Call Back feature does not work.

BRIEF SUMMARY

These and other needs are addressed by the various embodiments and configurations. A fingerprint is received from a communication endpoint. The fingerprint is based on a hardware identifier of the communication endpoint. For example, the fingerprint may be based on a Media Access Control (MAC) address of the communication endpoint. A request for an emergency call from the communication endpoint is received that also includes the fingerprint. For instance, a user may initiate a 911 call from the communication endpoint. The emergency call is established. After the emergency call is disconnected, a request for an emergency call back is received. For example, if the emergency call prematurely disconnected, the emergency call back is initiated. The request for the emergency call back is routed to the communication endpoint based on the fingerprint to ensure that the emergency call is properly completed.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 4 is a flow diagram of a process for requesting fingerprints from a vendor of a communication endpoint.

DETAILED DESCRIPTION

Figure 1:
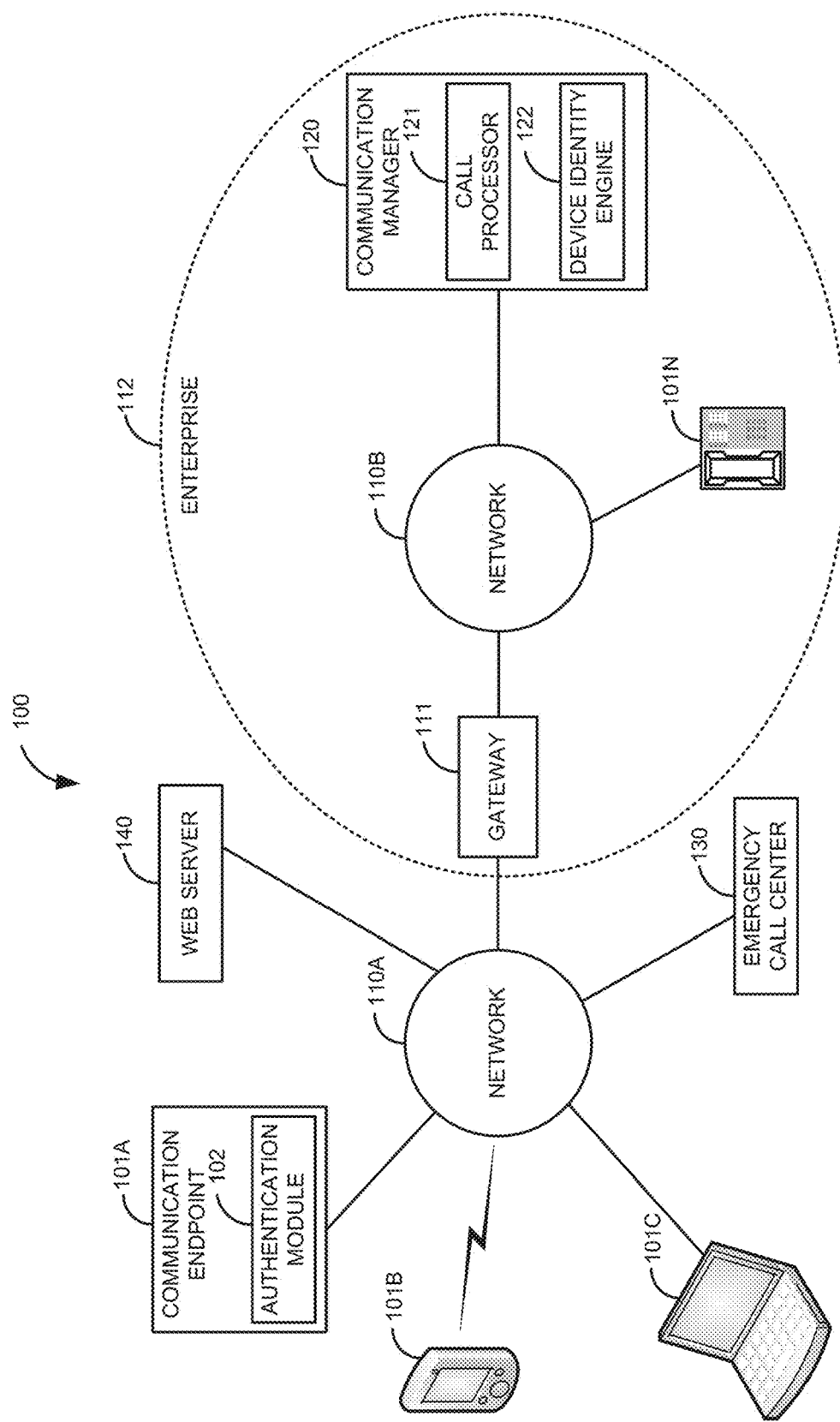
FIG. 1 is a block diagram of a first illustrative system for reconnecting an emergency call for an unregistered communication endpoint.

FIG. 1 is a block diagram of a first illustrative system 100 for reconnecting an emergency call for an unregistered communication endpoint 101. The first illustrative system 100 comprises communication endpoints 101A-101N, networks 110A-110B, a gateway 111, an enterprise 112, a communication manager 120, an emergency call center 130, and a web server 140.

The communication endpoint 101 can be or may include any hardware device that can communicate on the networks 110, such as a Personal Computer (PC), a telephone, a video system, a cellular telephone, a Personal Digital Assistant (PDA), a tablet device, a notebook device, a smart phone, and the like. As shown in FIG. 1, any number of communication endpoints 101A-101N may be connected to the networks 110A-110B, including only a single communication endpoint 101.

The communication endpoint 101A further comprises an authentication module 102. The authentication module 102 can be any hardware/software that can allow a user to authenticate to the enterprise 112. The authentication module 102 allows the user to access the enterprise 112 by providing one or more credentials, such a user name, password, digital certificate, bio metric, and/or the like. Typically, a user cannot make non-emergency calls without authenticating to the enterprise 112. However, the user can make emergency calls via the enterprise 112 (e.g., 911 calls) without having to authenticate to the enterprise 112. Although not shown, the communication endpoints 101B-101C may also comprise the authentication module 102.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B can use a variety of electronic protocols, such as Ethernet, Internet Protocol (IP), Transmission Communication Protocol (TCP), Session Initiation Protocol (SIP), Integrated Services Digital Network (ISDN), and the like. Thus, the networks 110A-110B are electronic communication networks configured to carry messages via packets and/or circuit switched communications.

In FIG. 1, the network 110A is typically a public network, such as, the Internet or the PSTN and the network 110B is typically a private network, such as, a corporate or enterprise network. However, the embodiments described herein are not limited to the configuration of FIG. 1.

The gateway 111 can be or may include any hardware coupled with software that can provide an interface between the networks 110A and 110B, such as a Session Border Controller (SBC), a firewall, a Network Address Translator (NAT), a proxy server, a combination of these, and the like. The gateway 111 may provide authentication services for the communication endpoints 101A-101C to access the enterprise 112 using the authentication module 102.

The enterprise 112 is a grouping of devices/networks 110 that are managed/controlled by the enterprise 112, such as a corporation, or entity. The enterprise 112 is typically a secure system/network 110B that is protected by the gateway 111 from the network 110A.

The communication manager 120 can be or may include any hardware coupled with software that can process voice and/or video communications, such as a Private Branch Exchange (PBX), a session manager, a router, a central office switch, and/or the like. The communication manager 120 may provide authentication services for the communication endpoints 101A-101N. The communication manager 120 further comprises a call processor 121 and a device identity engine 122.

The call processor 121 can be or may include any hardware processor coupled with software that can process voice or video calls, such as a microprocessor, a multi-core processor, a microcontroller, an application specific processor, a digital signaling processor, and/or the like.

The device identity engine 122 can be or may include any hardware/software that can manage the identity of the communication endpoints 101A-101N. The device identity engine 122 is shown in the communication manager 120. However, the device identity engine 122 may be in the gateway 111 or distributed between the communication manager 120 and the gateway 111. In one embodiment, the device identity engine 122 may be separate from the communication manager 120.

The emergency call center 130 can be or may include any hardware contact center that can handle emergency calls, such as, 911 calls in the United States. The emergency call center may be a Public Safety Access Point (PSAP). The emergency call center 130 may receive emergency calls for both voice and/or video calls.

The web server 140 can be or may include any hardware coupled with software that that can provide web services. The web server 140 can be a secure web server 140 that allows access for a specific user, an entity, an enterprise 112, and/or the like.

The above embodiment may include other elements, such as a Session Border Controller (SBC), firewalls, Network Address Translators (NAT), routers, and/or the like that works in conjunction with the communication manager 120. In addition, the communication endpoints 101A-101C may be used by remote workers that connect to the enterprise 112 via a Virtual Private Network (VPN). In this case, the communication endpoint 101A-101C would appear as communication endpoints 101 directly connected to the network 110B (i.e., enterprise users).

Figure 2:
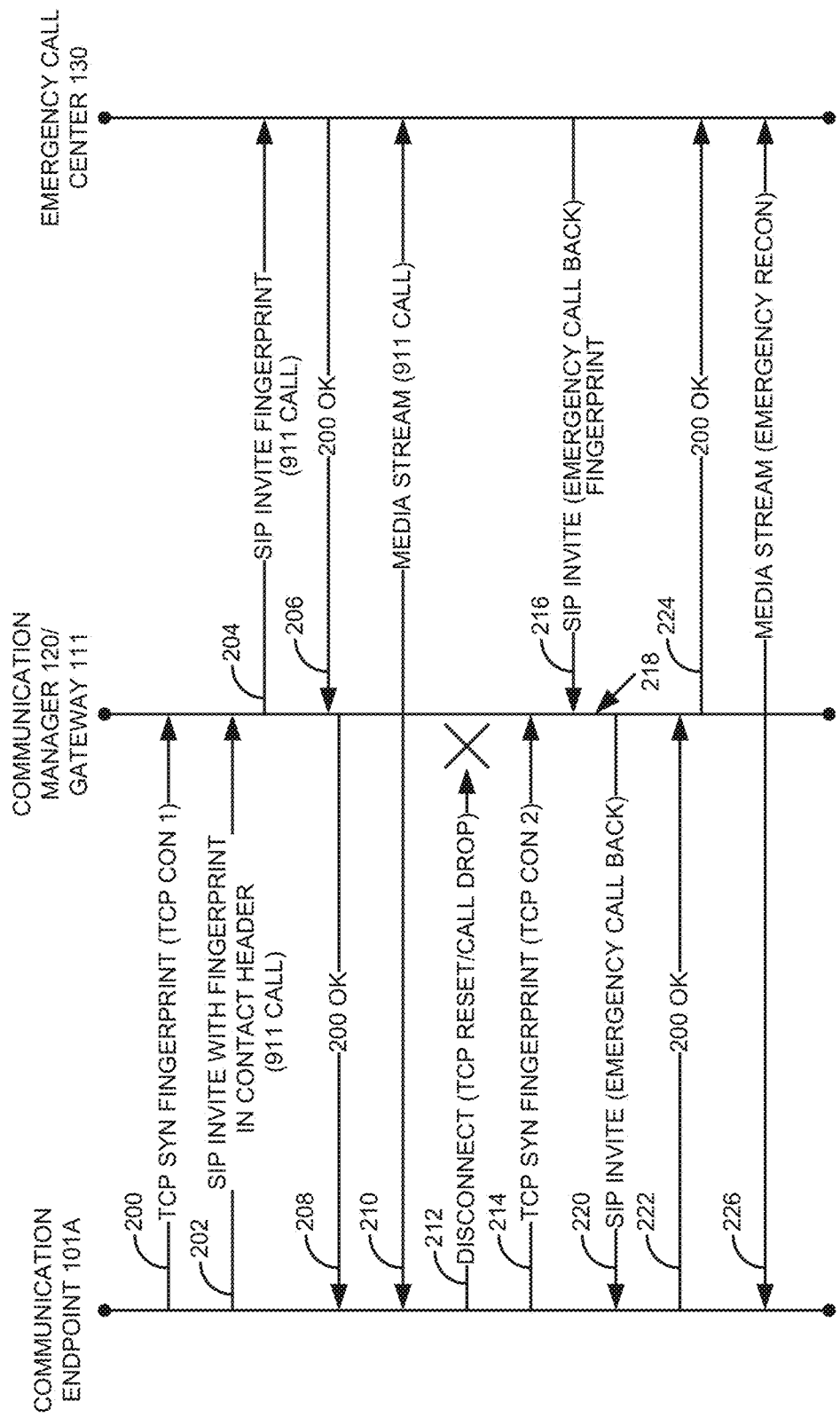
FIG. 2 is a flow diagram of a process for reconnecting an emergency call for an unregistered communication endpoint.
Figure 3:
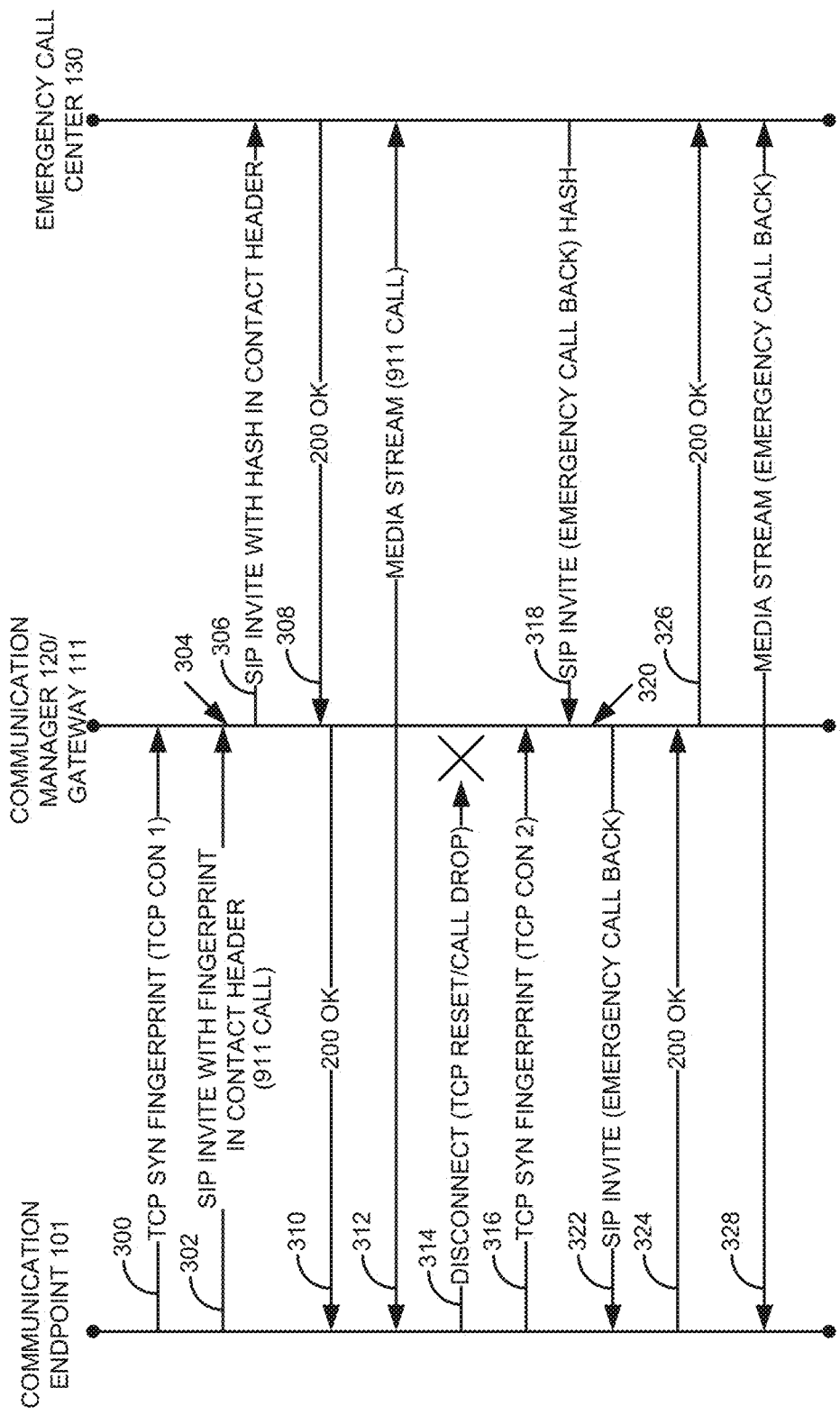
FIG. 3 is a flow diagram of a process for reconnecting an emergency call with hashing for increased security.

FIG. 2 is a flow diagram of a process for reconnecting an emergency call for an unregistered communication endpoint 101. Illustratively, the communication endpoints 101A-101N, the gateway 111, the enterprise 112, the communication manager 120, the call processor 121, the device identity engine 122, the emergency call center 130, and the web server 140 are stored-program-controlled entities, such as a computer or processor, which performs the method of FIGS. 2-4 and the processes described herein by executing program instructions stored in a computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts, in step 200, when the communication endpoint 101A boots up and establishes a first TCP connection. As part of the first TCP connection, the communication endpoint 101A sends a TCP SYN message with a fingerprint to the communication manager 120 in step 200. The first TCP connection is used to send Session Initiation Protocol (SIP) messages to establish voice or video communication sessions. The fingerprint is based on a hardware identifier of the communication endpoint 101A, such as, a Media Access Control (MAC) address, a circuit board identifier, a boot up identifier, a hardware serial number, and/or the like.

The fingerprint may be a device token for a specific domain/realm. The fingerprint may be provided to the communication manager 102 based on a unique key of the MAC address, a Virtual Local Area Network ID, a domain, and/or the like when the communication endpoint 101A first boots up. The fingerprint is then stored persistently on the communication endpoint 101A so that on a subsequent boot up, the communication endpoint 101A will not try and fetch the fingerprint.

At a later point in time, a user of the communication endpoint 101A initiates a request to make an emergency call (e.g., a 911 call). As a result, the communication endpoint 101A sends, in step 202, a SIP INVITE to the communication manger 120/gateway 111. The SIP INVITE of step 202 also includes the fingerprint in a SIP Contact header.

In one embodiment, the user has not authenticated to the enterprise 112. If the user has not authenticated to the enterprise 112, the SIP INVITE of step 202 includes an anonymous user (or no user) in the SIP From: header, a domain name in the SIP From: header, a contact address (the IP address of the communication endpoint 101A) and the fingerprint (which may be in a SIP Contact header). If the user is authenticated, the SIP From: header will include the user's identifier (e.g., user@companyx.com) instead of an anonymous user or no user.

The communication manager 120/gateway 111 receives the SIP INVITE for the emergency call in step 202. The communication manager 120/gateway 111 sends, in step 204, the SIP INVITE with the fingerprint in the SIP Contact header to the emergency call center 130. The emergency call center 130 responds by sending a SIP 200 OK message in step 206. The communication manager 120/gateway 111 sends the SIP 200 OK to the communication endpoint 101A in step 208. Although not shown, the communication endpoint 101A will send a SIP ACK, which is forwarded to the emergency call center 130 to establish the communication session. At this point a media stream (e.g., a voice or video stream) is established (e.g., using Real-Time Protocol (RTP)) for the emergency call in step 210.

The emergency call is prematurely disconnected in step 212. The voice or video call disconnects in step 212 in a non-standard fashion. For example, the communication link or the communication endpoint 101A may fail or reset. If the emergency call disconnects in a non-standard way, the first TCP connection will fail and have to be reset. The reset may be based on a connection oriented transport layer, such as TCP. As part of a TCP/TLS connection reset, the communication endpoint 101A sends a TCP SYN message that includes the fingerprint to establish a second TCP connection in step 214. The TCP SYN message of step 214 allows the system to work where dynamic IP addresses are used. For example, if the first TCP connection (with a first IP address) has failed (e.g., the communication endpoint 101A has rebooted), the communication endpoint 101A may receive a different IP address. By sending the TCP SYN message of step 214 (in the second TCP connection), the communication manager 120/gateway 111 will know that the communication endpoint 101A is now using a different IP address (for use with an emergency callback by mapping the fingerprint to the new IP address).

One feature of 911 calling is an emergency call back feature. For example, if during a 911 call, the call is prematurely disconnected, the emergency call center 130 may instigate an emergency call back to try and re-establish the voice or video communication session. The emergency call center 130 initiates the emergency call back by sending a SIP INVITE message with the fingerprint in step 216. In one embodiment, the fingerprint of step 216 is in a SIP request Universal Resource Identifier (URI). For example, the contact center 130 may construct the request URI from the Contact header of the SIP INVITE message received in step 204 when sending an emergency call back in step 216.

The communication manager 120/gateway 111 looks at the request Universal Resource Identifier in the SIP INVITE of step 216 to find the fingerprint. The device identity engine 122, in step 218, matches the fingerprint received in step 216 to the fingerprint received in steps 200 and/or 202. The communication manager 120/gateway 111 uses the fingerprint extracted in step 216 and finds the IP address of the communication endpoint 101A based on the TCP SYN of step 214 (where the voice or video call disconnected abnormally and a new IP address may have been assigned to the communication endpoint 101A). The SIP INVITE of step 216 is routed to the communication endpoint 101A based on the current IP address of the communication endpoint 101A (i.e., from the IP address of the communication endpoint 101A in the TCP SYN message of step 200 or 214) in step 220.

The communication endpoint 101A sends a SIP 200 OK message in step 222. The communication manager 120/gateway 111 forwards the SIP 200 OK message, in step 224, to the emergency call center 130. Although not shown, the emergency call center 130 sends a SIP ACK that is forwarded to the communication endpoint 101A to establish the emergency call back. The media stream of the emergency call back call is then sent in step 226 (e.g., using RTP).

FIG. 3 is a flow diagram of a process for reconnecting an emergency call with hashing for increased security. The process starts in step 300 when the communication endpoint 101A boots up and establishes a first TCP connection. As part of the first TCP connection, the communication endpoint 101A sends a TCP SYN message with a fingerprint to the device identity engine 122 in step 300. The first TCP connection is used to send Session Initiation Protocol (SIP) messages to establish voice or video communication sessions. The fingerprint is based on a hardware identifier of the communication endpoint 101A, such as a Media Access Control (MAC) address, a circuit board identifier, a boot up identifier, a hardware serial number, and/or the like.

The fingerprint may be a device token for a specific domain/realm. The fingerprint may be provided by the device identity engine 122 based on a unique key of the MAC address, a Virtual Local Area Network ID, a domain, and/or the like when the communication endpoint 101A first boots up. The fingerprint is then stored persistently on the communication endpoint 101A so that when on a subsequent boot up, the communication endpoint 101A will not try and fetch a new token.

At a later point in time, a user of the communication endpoint 101A initiates a request to make an emergency call (e.g., a 911 call). As a result, the communication endpoint 101A sends, in step 302, a SIP INVITE to the communication manger 120/gateway 111. The SIP INVITE of step 302 also includes the fingerprint in a SIP Contact header.

In one embodiment, the user has not authenticated to the enterprise 112. If the user has not authenticated to the enterprise 112, the SIP INVITE of step 302 may include an anonymous user (or no user) in the SIP From: header, a domain name in the SIP From: header, a contact address (the IP address of the communication endpoint 101A) and the fingerprint (that may be in a SIP Contact header). If the user is authenticated, the SIP From: header will include the user's identifier (e.g., user@companyx.com) instead of an anonymous user.

The communication manager 120/gateway 111 receives the SIP INVITE for the emergency call with the fingerprint in step 302. The communication manager 120 takes the fingerprint as an input to a hashing algorithm, such BLAKE-256, HASHVAL, MD4, MD5, MD6, SHA-1, SHA-256, and/or the like in step 304. The fingerprint (e.g., a MAC address) may be hashed with other parameters, such as a domain name, a contact address (the IP address of the communication endpoint 101A), a Virtual LAN parameter, and/or the like as input to the hashing algorithm of step 304 to produce a hash value. The purpose of the hash value is to provide enhanced security because the fingerprint has been hashed to produce a hash value that cannot easily be deciphered.

In addition, the device identity engine 122 associates the hash value with the fingerprint for use later in steps 316 and 318. The hash value is persistently maintained for a given time period. For example, the time period will be long enough to cover any emergency call backs.

The communication manager 120/gateway 111 sends, in step 306, the SIP INVITE with the hash value to the emergency call center 130. The hash value is in the SIP Contact header. The emergency call center 130 responds by sending a SIP 200 OK message in step 308. The communication manager 120/gateway 111 sends the SIP 200 OK to the communication endpoint 101A in step 310. Although not shown, the communication endpoint 101A will send a SIP ACK, which is forwarded to the emergency call center 130 to establish the communication session. At this point a media stream (e.g., a voice or video stream) is established (e.g., using Real-Time Protocol (RTP)) for the emergency call in step 312.

At this point, the voice or video call is prematurely disconnected in step 314. The voice or video call disconnects in step 314 in a non-standard fashion. If the voice or video call disconnects in a non-standard way, the first TCP connection will fail and have to be reset. As part of the TCP/TLS connection reset, the communication endpoint 101A sends a TCP SYN message that includes the fingerprint to establish a second TCP connection in step 316. The TCP SYN message of step 316 allows the system to work where dynamic IP addresses are used. For example, if the first TCP connection (with a first IP address) has failed (e.g., the communication endpoint 101A has rebooted), the communication endpoint 101A may receive a different IP address. By sending the TCP SYN message of step 316 (in the second TCP connection), the communication manager 120/gateway 111 will know that the communication endpoint 101A is now using a different IP address in the second TCP connection (for use with an emergency callback).

In response to the emergency disconnect, the emergency call center 130 initiates an emergency call back by sending a SIP INVITE message with the hash value in step 318. The hash value is in the SIP request URI. For example, the contact center 130 will copy all or a portion of the Contact header of step 306 (that includes hash) into the SIP request URI when sending an emergency call back in step 318. The communication manager 120/gateway 111 matches the sent hash value of step 306 and the received hash value of step 318 in step 320. The communication manager 120/gateway 111 knows the IP address of the communication endpoint 101A based on the TCP SYN of step 316 (where the voice or video call disconnected abnormally and a new IP address may have assigned to the communication endpoint 101A on the second TCP connection). The SIP INVITE of step 318 is routed to the communication endpoint 101A based on the current IP address of the communication endpoint 101A (i.e., from the IP address of the communication endpoint 101A in the TCP SYN message of 316) in step 322.

The communication endpoint 101A sends a SIP 200 OK message in step 324. The communication manager 120/gateway 111 forwards the SIP 200 OK message in step 326 to the emergency call center 130. Although not shown, the emergency call center 130 sends a SIP ACK that is forwarded to the communication endpoint 101A to establish the voice or video communication session. The media stream of the emergency call back call is then sent in step 328 (e.g., using RTP).

The above descriptions are described where TCP SYN messages are used to send the fingerprints. However, the above process will work with other protocols, such a Transport Layer Security (TLS) and the like.

FIG. 4 is a flow diagram of a process for requesting fingerprints from a vendor of a communication endpoint 101. The process starts in step 400 when the device identity engine 122 sends a request to the web server 140 to request a range of fingerprints. The range of fingerprints may be for a specific vendor or for a group of vendors. The range of fingerprints may be associated with a specific type of hardware, such as a network interface, a circuit board, a communication endpoint 101, and/or the like. The request for the range of fingerprints in step 400 may be requested using various protocols. For example the request of step 400 may be made using a Hyper Text Transport Protocol (HTTP) GET. The web server 140 responds to the request of step 400 by sending a range of fingerprints to the device identity engine 112 in step 402. For example, by sending an HTTP response message.

The communication endpoint 101A boots up in step 404 and sends a MAC address to the communication manager 120/gateway 111 in step 406. The device identity engine 112, determines, based on the MAC address, a fingerprint from the range of fingerprints in step 408. The device identity engine 112 sends the determined fingerprint to the communication endpoint 101A in step 410. The fingerprint that is received is to uniquely identify the communication device 101A. The fingerprint is then sent in steps 200 and/or 300.

Although the above processes are described using SIP, the above processes may be adapted to use other protocols, such as H.323, Video protocols, and/or the like.

The above descriptions disclose where the communication endpoint 101A is external to the enterprise 112. However, the above process will also work where the communication devices 101A-101C are within the enterprise 112. The user may be authenticated or not authenticated in order to make an emergency call.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to a generic communication network. However, to avoid unnecessarily obscuring the present disclosure, the preceding description omits a number of known structures and devices. This omission is not to be construed as a limitation of the scope of the present disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer readable medium, coupled with the microprocessor and comprising microprocessor readable and executable instructions that cause the microprocessor to execute:
    a communication manager that receives a fingerprint in a first Transmission Communication Protocol (TCP) SYN message, wherein the fingerprint is based on a hardware identifier of a first communication endpoint and wherein the hardware identifier of the first communication endpoint is based on at least one of a Media Access Control (MAC) address, a circuit board identifier, a boot up identifier, a hardware serial number, and a Virtual Local Area Network Identifier (VLAN ID); receives a request for an emergency call from the first communication endpoint, wherein the first communication endpoint is on a first network, and wherein the request for the emergency call comprises the fingerprint; establishes the emergency call with a second communication endpoint, wherein the second communication endpoint is on a second network; receives a request for an emergency call back from the second communication endpoint, wherein the request for the emergency call back comprises the fingerprint and wherein the request for the emergency call back is based on a disconnection of the first communication endpoint from the established emergency call; and routes the request for the emergency call back received from the second communication endpoint on the second network to the first communication endpoint on the first network based on the fingerprint received in the request for the emergency call back.

2. The system of claim 1, wherein a user of the first communication endpoint is not logged in and can still make the request for the emergency call and wherein the user of the first communication endpoint has to be logged in order to make a non-emergency call.

3. The system of claim 1, wherein the disconnection of the first communication endpoint from the established emergency call is based on a reset of a connection-oriented transport layer protocol.

4. The system of claim 1, wherein the request for the emergency call is received in a first Transmission Communication Protocol (TCP) connection, wherein the first TCP SYN message is received in the first TCP connection, and wherein:
    the communication manager receives the fingerprint in a second TCP SYN message in a second TCP connection from the first communication endpoint after the disconnection of the first communication endpoint from the established emergency call, and wherein the request for the emergency call back is routed to the first communication endpoint based on the second TCP SYN message in the second TCP connection and based on connection attributes in the second TCP SYN.

5. The system of claim 4, wherein the first communication endpoint uses a first Internet Protocol (IP) address in the first TCP connection and the first communication endpoint uses a second IP address in the second TCP connection.

6. The system of claim 1, wherein the request for the emergency call is a first SIP INVITE, wherein the received fingerprint is the MAC address of the first communication endpoint and wherein:
    the communication manager hashes a domain name, a contact address, and the MAC address of the first communication endpoint into a hash value and sends the first SIP INVITE with the hash value as the fingerprint in a SIP Contact header.

7. The system of claim 6, wherein the request for the emergency call back is a second SIP INVITE that has the hash value in a SIP request Universal Resource Identifier (URI) and wherein the hash value in the SIP request URI is used by the communication manager to route the second SIP INVITE to the first communication endpoint.

8. The system of claim 1, wherein the fingerprint is based on at least one of a hash of the hardware identifier and the VLAN ID.

9. The system of claim 1, wherein:
    a device identity engine receives the hardware identifier, determines, based on the hardware identifier, a device token from a range of device tokens, wherein the range of device tokens comprises device tokens from a registered Universal Resource Locator (URL) for a vendor of the first communication endpoint and sends the device token to the first communication endpoint.

10. The system of claim 1, wherein the request for the emergency call is a SIP INVITE message.

11. A method comprising:
    receiving, by a processor, in a first Transmission Communication Protocol (TCP) SYN message, a fingerprint, wherein the fingerprint is based on a hardware identifier of a first communication endpoint and wherein the hardware identifier of the first communication endpoint is based on at least one of a Media Access Control (MAC) address, a circuit board identifier, a boot up identifier, a hardware serial number, and a Virtual Local Area Network Identifier (VLAN ID);

receiving, by the processor, a request for an emergency call from the first communication endpoint, wherein the first communication endpoint is on a first network and wherein the request for the emergency call comprises the fingerprint;

establishing, by the processor, the emergency call with a second communication endpoint, wherein the second communication endpoint is on a second network;

receiving, by the processor, a request for an emergency call back from the second communication endpoint, wherein the request for the emergency call back comprises the fingerprint and wherein the request for the emergency call back is based on a disconnection of the first communication endpoint from the established emergency call; and routing, by the processor, the request for the emergency call back received from the second communication endpoint on the second network to the first communication endpoint on the first network based on the fingerprint received in the request for the emergency call back.

12. The method of claim 11, wherein a user of the first communication endpoint is not logged in and can still make the request for the emergency call and wherein the user of the first communication endpoint has to be logged in order to make a non-emergency call.

13. The method of claim 11, wherein the disconnection of the first communication endpoint from the established emergency call is based on a reset of a connection-oriented transport layer protocol.

14. The method of claim 11, wherein the request for the emergency call is received in a first Transmission Communication Protocol (TCP) connection, wherein the first TCP SYN message is received in the first TCP connection, and further comprising:

after the disconnection of the first communication endpoint from the established emergency call, receiving, by the processor, the fingerprint in a second TCP SYN message in a second TCP connection from the first communication endpoint, wherein the request for the emergency call back is routed to the first communication endpoint based on the second TCP SYN message in the second TCP connection.

15. The method of claim 14, wherein the first communication endpoint uses a first Internet Protocol (IP) address in the first TCP connection and the first communication endpoint uses a second IP address in the second TCP connection.

16. The method of claim 11, wherein the request for the emergency call is a first SIP INVITE, wherein the received fingerprint is the MAC address of the first communication endpoint, and further comprising:

hashing a domain name, a contact address, and the MAC address of the first communication endpoint into a hash value; and sending the first SIP INVITE with the hash value as the fingerprint in a SIP Contact header.

17. The method of claim 16, wherein the request for the emergency call back is a second SIP INVITE that has the hash value in a SIP request Universal Resource Identifier (URI) and wherein the hash value in the SIP request URI is used by the processor to route the second SIP INVITE to the first communication endpoint.

18. The method of claim 11, wherein the fingerprint is based on at least one of a hash of the hardware identifier, and the VLAN ID.

19. The method of claim 11, further comprising:

receiving, by the processor, the MAC address of the first communication endpoint;

determining, by the processor, based on the MAC address, the fingerprint from a range of fingerprints, wherein the range of fingerprints comprises device tokens from a registered Universal Resource Locator (URL) for a vendor of the first communication endpoint; and sending, by the processor, the fingerprint to the first communication endpoint.

20. The method of claim 11, wherein the fingerprint is based on the VLAN ID.

* * * * *